(12) United States Patent
Paradis

(10) Patent No.: US 6,542,361 B2
(45) Date of Patent: Apr. 1, 2003

(54) SYSTEM FOR COOLING COMPUTER COMPONENTS HOUSED WITHIN A COMPUTER CASING

(75) Inventor: Gabriel Paradis, Victoriaville (CA)

(73) Assignee: ASC Thermo-Solutions Inc., Victoriaville (CA)

( * ) Notice: Subject to any disclaimer, the term of this patent is extended or adjusted under 35 U.S.C. 154(b) by 0 days.

(21) Appl. No.: 09/934,635

(22) Filed: Aug. 23, 2001

(65) Prior Publication Data

US 2003/0039095 A1 Feb. 27, 2003

(51) Int. Cl.⁷ .................................................. G06F 1/16
(52) U.S. Cl. ........................ 361/687; 361/683; 361/716
(58) Field of Search .................... 361/679, 683–716

(56) References Cited

U.S. PATENT DOCUMENTS

| | | |
|---|---|---|
| 4,600,050 A | 7/1986 | Noren |
| 4,628,992 A | 12/1986 | Kennedy |
| 4,665,707 A * | 5/1987 | Hamilton ..................... 361/384 |
| 4,949,218 A | 8/1990 | Blanchard et al. |
| 5,297,005 A | 3/1994 | Gourdine |
| 5,422,787 A | 6/1995 | Gourdine |
| 5,931,002 A | 8/1999 | Nagashima |
| 5,946,188 A * | 8/1999 | Rochel et al. ............... 361/690 |
| 6,038,128 A | 3/2000 | Hood, III et al. |
| 6,055,814 A | 5/2000 | Song |
| 6,191,943 B1 | 2/2001 | Tracy |
| 6,196,003 B1 | 3/2001 | Macias et al. |
| 6,215,660 B1 * | 4/2001 | Lin ............................ 361/695 |

* cited by examiner

Primary Examiner—Darren Schuberg
Assistant Examiner—Yean Hsi Chang
(74) Attorney, Agent, or Firm—Robert Mitchell; Ogilvy Renault

(57) ABSTRACT

A computer cooling system adapted to be installed in a drive bay of an existing computer casing to cool the inside of the casing. The cooling system includes a thermo-electric heat exchanger defining first and second superposed air channels respectively in heat transfer communication with the hot and cold sides of Peltier devices. The cooled ambient air is discharged into the computer casing while the heated ambient air is directed into an evaporator for evaporating the condensate formed during cooling of the air discharged into the computer casing.

23 Claims, 2 Drawing Sheets

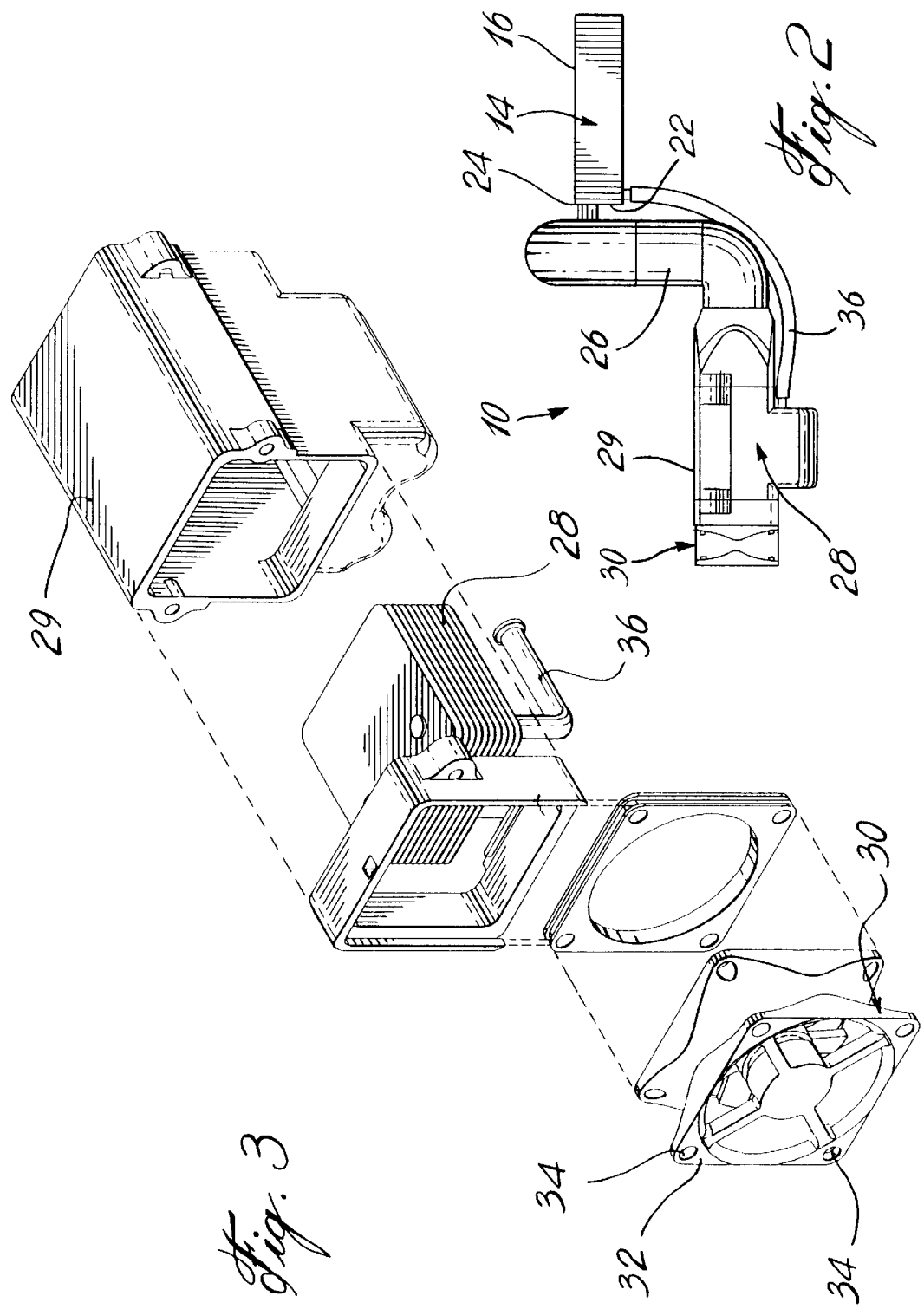

SYSTEM FOR COOLING COMPUTER COMPONENTS HOUSED WITHIN A COMPUTER CASING

BACKGROUND OF THE INVENTION

1. Field of the Invention

The present invention relates to cooling systems and, more particularly, to cooling systems which are adapted to cool the air within a computer casing.

2. Description of the Prior Art

Today, computers are releasing more and more heat because many components such as processors, video cards and hard drives run faster and do not aid in cooling the air within the computer casing. Instead, they contribute to a higher internal temperature causing stability issues.

Most computer enclosures are air cooled with fans circulating air from the enclosure into ambient of the room within which the computer enclosure is located. In the past, it has been proposed to group such computer enclosures in a same room and use refrigeration systems to cool the entirety of the ambient in the room. This approach is quite expensive and is sometimes physically impracticable or undesirable.

It has also been proposed to install heat exchanger units in the drive bays of computer casings to cool the internal temperature thereof. U.S. Pat. No. 6,196,003 issued on March 2001 to Macias et al. discloses such a unit comprising a first heat exchanger module through which the air within the computer casing is circulated to decrease the internal temperate of the computer casing. The condensate formed during cooling of the air within the computer casing is directed into a second heat exchanger where ambient air is drawn from the front side of the computer casing and heated up to evaporate the condensate before being discharged back on the front side of the computer casing.

Although, the above-described system is to some extent satisfactory, it has been found that there is a need for a new computer casing cooling system having increased cooling and humidity control capacity.

SUMMARY OF THE INVENTION

It is therefore an aim of the present invention to provide a new cooling system for cooling the air within a computer casing.

It is also an aim of the present invention to provide a cooling system, which has a reliable cooling capacity.

It is a further aim of the present invention to provide a cooling system, which can be conveniently retrofitted to an existing computer casing.

Therefore, in accordance with the present invention, there is provided a computer casing cooling system for cooling the air within a computer casing. The system comprises a thermo-electric heat exchanger adapted to be mounted to the computer casing and having cold and hot sides. First and second air channels are provided for receiving ambient air from outside of the computer casing. A fan arrangement is provided for drawing ambient air through the first and second air channels. The first air channel is in heat conductive contact with the cold side of the thermo-electric heat exchanger for cooling incoming ambient air before being directed into the computer casing. The second air channel is in heat conductive contact with the hot side of the thermo-electric heat exchanger for heating incoming ambient air drawn through the second air passage. An evaporator is connected in fluid flow communication with the second air channel for receiving heated air therefrom to evaporate condensate formed during cooling of the incoming ambient air in the first air channel.

In accordance with the present invention there is provided a computer casing cooling system in combination with a computer of the type including a computer casing housing a power supply and a number of electronic components. The computer casing cooling system comprises a thermo-electric heat exchanger mounted to the computer casing and having cold and hot sides, first and second air channels for receiving ambient air from outside of the computer casing, at least one air movement device for drawing ambient air through said first and second air channels, said first air channel being in heat conductive contact with said cold side for cooling incoming ambient air before being directed into the computer casing, said second air channel being in heat conductive contact with said hot side for heating incoming ambient air drawn therethrough, and an evaporator connected in fluid flow communication with said second air channel for receiving heated air therefrom to evaporate condensate formed during cooling of the incoming ambient air in said first air channel.

In accordance with a further general aspect of the present invention, there is provided a method for retrofitting an existing computer casing with a computer casing cooling system, comprising the steps of: a) providing a thermo-electric heat exchanger having cold and hot sides respectively in heat conductive contact with first and second air channels, b) mounting the thermo-electric heat exchanger to the computer casing, c) connecting an evaporator mounted in fluid flow communication with said second air channel with a cooling fan, and d) improving a sealing of said computer casing so as to reduce air exchange between the atmosphere and said computer casing.

BRIEF DESCRIPTION OF THE DRAWINGS

Having thus generally described the nature of the invention, reference will now be made to the accompanying drawings, showing by way of illustration a preferred embodiment thereof, and in which:

FIG. 2 is a side elevation view of the computer casing cooling system of FIG. 1; and FIG. 3 is an exploded perspective view of a rear section of the computer casing cooling system.

DESCRIPTION OF THE PREFERRED EMBODIMENTS

Figure 1:
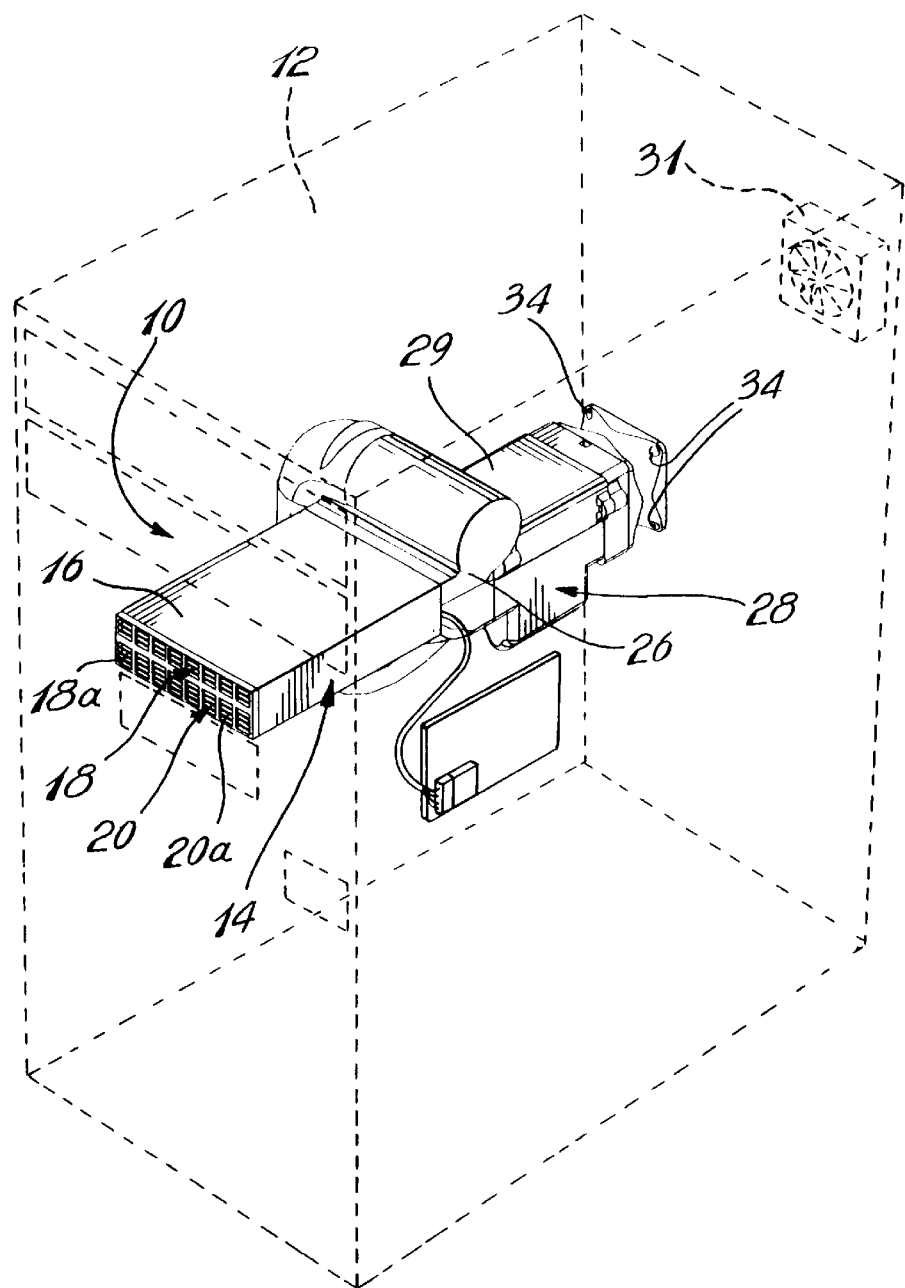
FIG. 1 is a perspective view of a computer casing cooling system mounted within a computer casing in accordance with a first embodiment of the present invention.

FIG. 1 illustrates a new cooling system 10 for cooling the air within a computer casing 12. The cooling system 10 is essentially based on thermal electric cooling and generally comprises a thermo-electric heat exchanger 14 utilizing the so called peltier effect so as to cool the inlet air as it is being drawn into the computer casing 12.

More specifically, the thermo-electric heat exchanger 14 is adapted to be retrofitted to existing computer casings and includes a casing 16 adapted to be mounted, for instance, in a drive bay defined in the frontal plate of the computer casing 12. The thermo-electric heat exchanger 14 defines upper and lower superposed air channels 18 and 20 separated by a common horizontal plate 19 in thermal conductive contact with a number of conventional peltier devices (not shown). Current is supplied to the peltier devices from the power supply of the computer in which the system 10 is installed. The rate of heat transfer of the peltier devices is adjusted by controlling the current amounts supplied thereto by means of a control unit (not shown) receiving input data from temperature sensors installed at appropriate locations within the computer casing 12. In this way, feedback control can be performed so that the temperature inside the computer casing 12 can be adjusted to a desired temperature.

The lower air channel 20 is in heat conductive contact with the cold side of the peltier devices or plates, whereas the upper air channel 18 is in conductive contact with the hot side of the peltier plates. As seen in FIG. 1, the upper and lower channels 18 and 20 are provided with respective air intakes 18a and 20a for admitting air into the thermoelectric heat exchanger 14 from outside of the computer casing 12 once the heat exchanger 14 has been mounted into one of the drive bays defined therein. A plurality of vertical fins (not shown) can be provided in the upper and lower channels 18 and 20 to promote heat transfer.

As can be appreciated from FIG. 2, the lower air channel 20 has an exhaust port 22 or outlet for discharging the pre-cooled ambient air into the internal space defined by the computer casing 12. By contrast the upper air channel 18 is connected at an outlet end 24 thereof to a conduit 26 extending from the upper air channel 18 to an evaporator 28 having a casing 29. Accordingly, the air inducts by the upper air channel 18 is directed into the evaporator 28 through the conduit 26. The conduit 26 is preferably made of rigid tubing to provide support to the evaporator 28. As can be seen from FIG. 2, the conduit 26 extends rearwardly from the heat exchanger 14, then vertically downwardly and finally horizontally rearwardly towards a rear panel of the computer casing 12. An exhaust fan 30 is mounted downstream of the evaporator 28 for drawing ambient air through the upper air channel 18, the conduit 26 and the evaporator 28 before being discharged from the computer casing 12 through a vent (not shown) defined in the rear panel thereof. The fan 30 may consist of the existing ventilation fan of the computer casing 12. As illustrated in FIG. 3, the fan 30 has a flange 32 defining holes 34 for receiving fasteners for securing the fan 30 to the computer casing rear panel.

A flexible hose 36 extends from a drain (not shown) defined in the bottom of the lower air channel 20 for receiving condensate from the cooled air within the lower channel 20. The flexible hose 36 is connected at its opposite end to a lower end of the evaporator 28 (see FIG. 3). The condensate is thus gravity fed down to the evaporator 28 via the hose 36.

Ambient air is drawn through the lower channel 20 and into the internal space of the computer casing 12 by a second fan 31. According to a preferred embodiment of the present invention, the fan 31 of the computer power supply is advantageously used for drawing cooled ambient air into the computer casing 12 via the lower air channel 20, thereby obviating the need for installing an additional fan in the computer casing. In this case the ventilating openings normally defined in conventional computer casings are sealed off to provide a substantially airtight computer casing. Applying a tape on the computer casing 12 over the ventilating openings can do this. Alternatively, any appropriate covering member can be installed on the computer casing 12 to seal it from the atmosphere and, thus, allow a negative pressure to be reached therein through the operation of the fan 30.

Tubing can also be connected to the outlet end of the lower air channel 20 to direct the cooled air towards a specific computer component, such a CPU.

In operation, ambient or external air is simultaneously drawn into the upper and lower air channels 20 and 18 respectively by the fan 30 and the power supply fan. The air flowing through the lower channel 20 is in heat transfer communication with the cold side of the peltier plates and is, thus, cooled at a desired temperature before being discharged into the internal space of the computer casing 12. In contrast, the ambient air drawn into the upper channel 18 is in heat transmission contact with the hot side of the peltier plates and is, thus, heated up before being directed into the evaporator 28. The condensate resulting from the cooling of the air circulated in the lower channel 20 is directed into the evaporator 28 where it is evaporated in the heated air emanating from the upper channel 18 before being discharged outside of the computer casing 12.

One advantage of the present invention resides in the fact that it can be readily and conveniently retrofitted to an existing computer without modification to the existing casing. Moreover, it allows taking advantage of the existing equipment in the computer casing. Indeed, as mentioned hereinbefore, the power supply fan can be used to draw ambient air into the lower channel 20. A still further advantage of the present invention resides in the fact that it allows to control the total environment temperature of a computer. The above-described cooling system when coupled with a dust and moisture filtration system will offer greater stability and better dust control with a low level of noise.

What is claimed is:

1. A computer casing cooling system for cooling the air within a computer casing, comprising a thermo-electric heat exchanger adapted to be mounted to the computer casing and having cold and hot sides, first and second air channels for receiving ambient air from outside the computer casing, at least one air movement device for drawing ambient air through said first and second air channels, said first air channel being in heat conductive contact with said cold side for cooling incoming ambient air before being directed into the computer casing, said second air channel being in heat conductive contact with said hot side for heating incoming ambient air drawn therethrough, and an evaporator for receiving condensate formed during cooling of the ambient air in said first air channel, said evaporator being connected in fluid flow communication with said second air channel for receiving heated air therefrom to evaporate the condensate and release the same externally of the computer casing.

2. A computer casing cooling system as defined in claim 1, wherein said first air channel is adapted to receive the condensate and has a drain, and wherein a condensate conduit extends from said drain to said evaporator for directing the condensate from the first air channel to the evaporator.

3. A computer casing cooling system as defined in claim 1, wherein said first and second air channels are provided with respective adjacent air intakes, and wherein an exhaust port is provided to discharge the heated air circulated through the evaporator outside of the computer casing on a side opposite to said air intakes.

4. A computer casing cooling system as defined in claim 1, wherein said first air channel has an air outlet adapted to open to the interior of the computer casing once said thermo-electric heat exchanger has been mounted to the computer casing.

5. A computer casing cooling system as defined in claim 1, wherein said air movement device includes a first fan for drawing ambient air through a closed path defined by said second air channel and said evaporator, and a second fan for drawing air through said first air channel and into the computer casing.

6. A computer casing cooling system as defined in claim 5, wherein said second fan is operative to create a negative pressure within the computer casing, thereby causing ambient air to be drawn within the computer casing through said first air channel.

7. A computer casing cooling system as defined in claim 6, wherein said second fan is a fan of a power supply housed within the computer casing.

8. A computer casing cooling system as defined in claim 5, wherein said evaporator is located at a lower elevation than said thermo-electric heat exchanger for allowing the condensate to be gravity fed down to the evaporator from said first air channel.

9. A computer casing cooling system as defined in claim 8, wherein said evaporator and said first fan are unitary assembled together in said closed path.

10. A computer casing cooling system as defined in claim 9, wherein said evaporator is located inside the computer casing.

11. A computer casing cooling system as defined in claim 1, wherein said thermo-electric heat exchanger includes at least one peltier device, and wherein said peltier device is placed between said first and second air channels.

12. A computer casing cooling system as defined in claim 11, wherein said thermo-electric heat exchanger is adapted to be inserted and mounted in a drive bay of the computer casing.

13. A computer casing cooling system as defined in claim 12, wherein said second air channel extends over said first air channel.

14. A computer casing cooling system in combination with a computer of the type including a computer casing housing a power supply and a number of electronic components, the computer casing cooling system comprising a thermo-electric heat exchanger mounted to the computer casing and having cold and hot sides, first and second air channels for receiving ambient air from outside the computer casing, at least one air movement device for drawing ambient air through said first and second air channels, said first air channel being in heat conductive contact with said cold side for cooling incoming ambient air before being directed into the computer casing, said second air channel being in heat conductive contact with said hot side for heating incoming ambient air drawn therethrough, and an evaporator for receiving condensate formed during cooling of the ambient air in said first air channel, said evaporator being connected in fluid flow communication with said second air channel for receiving heated air therefrom to evaporate the condensate and release the condensate externally of the computer casing.

15. A combination as defined in claim 14, wherein said thermo-electric heat-exchanger is mounted in a drive bay defined in said computer casing for allowing ambient air to be inducted from a first side of the computer casing, and wherein an outlet is provided to discharge the heated air circulated through the evaporator outside the computer casing on a side thereof opposite to said first side.

16. A combination as defined in claim 14, wherein said first air channel is adapted to receive the condensate and has a drain, and wherein a condensate conduit extends from said drain to said evaporator for directing the condensate from the first air channel to the evaporator.

17. A combination as defined in claim 14, wherein said first air channel has an air outlet opening to the interior of the computer casing.

18. A combination as defined in claim 14, wherein said air movement device includes a first fan for drawing ambient air through a closed path defined by said second air channel and said evaporator, and a second fan for drawing air through said first air channel and into the computer casing.

19. A combination as defined in claim 18, wherein said power supply has a fan, and wherein said second fan is the fan of the power supply.

20. A combination as defined in claim 18, wherein said second fan is operative to create a negative pressure in said computer casing to cause the ambient air to be drawn into the computer casing through said first air channel.

21. A combination as defined in claim 20, further including a covering member for substantially sealing said computer casing from the atmosphere.

22. A combination as defined in claim 14, wherein said thermo-electric heat exchanger includes at least one peltier device, and wherein said peltier device is placed between said first and second air channels.

23. A method for retrofitting an existing computer casing with a computer casing cooling system, comprising the steps of: a) providing a thermo-electric heat exchanger having cold and hot sides respectively in heat conductive contact with first and second air channels, b) mounting the thermo-electric heat exchanger to the computer casing, c) connecting an evaporator mounted in fluid flow communication with said second air channel with a cooling fan, and d) improving a sealing of said computer casing so as to reduce air exchange between the atmosphere and said computer casing.

* * * * *